July 25, 1939.   C. H. H. RODANET   2,167,374
SWITCH UNIT
Filed July 30, 1936   3 Sheets-Sheet 1
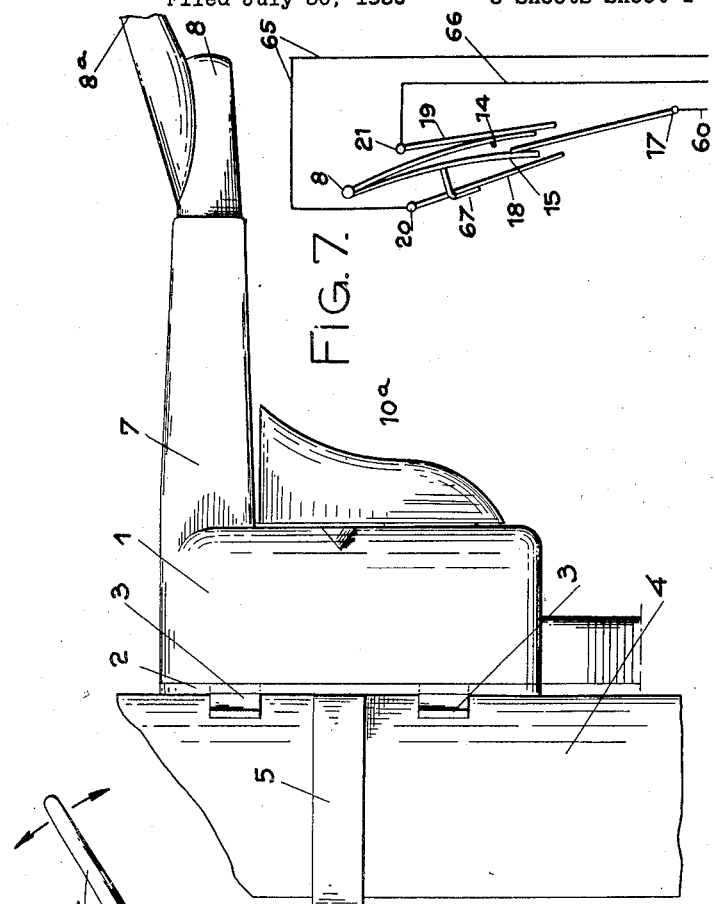
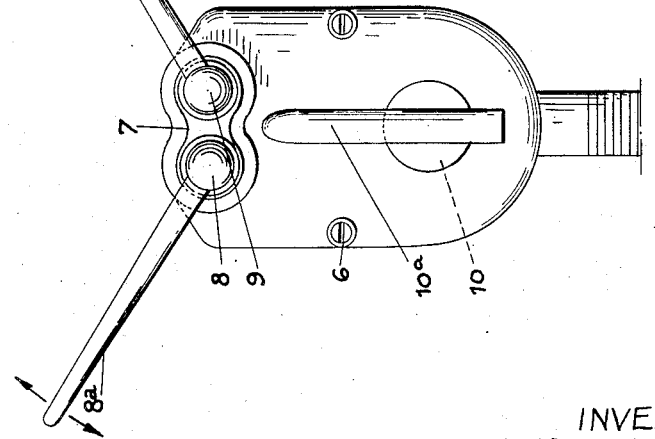
INVENTOR:
CHARLES HILAIRE
HENRI RODANET
BY Haseltine, Lake & Co.
ATTORNEYS July 25, 1939.  C. H. H. RODANET  2,167,374

SWITCH UNIT

Filed July 30, 1936   3 Sheets-Sheet 2

INVENTOR:
CHARLES HILAIRE
HENRI RODANET
BY Haseltine, Lake & Co.
ATTORNEYS

July 25, 1939.  C. H. H. RODANET  2,167,374

SWITCH UNIT

Filed July 30, 1936   3 Sheets-Sheet 3

INVENTOR:
CHARLES HILAIRE
HENRI RODANET

BY Haseltine, Lake & Co.
ATTORNEYS

UNITED STATES PATENT OFFICE 2,167,374

SWITCH UNIT

Charles Hilaire Henri Rodanet, Neuilly-sur-Seine, France, assignor to Société Anonyme: Etablissements Ed. Jaeger, Levallois-Perret (Seine), France Application July 30, 1936, Serial No. 93,421
In France September 25, 1935

6 Claims. (Cl. 200—5)

It has already been proposed to control the lighting circuits of motor vehicles by means of two switches. The first switch controls the lighting circuits and it can occupy a plurality of positions so that: in one position, all the lighting circuits are cut off and all the lamps of the vehicle are extinguished; in another position, the lighting circuit for the lamps of the front lights and the lighting circuit for the lamps of the rear lights are closed so that these lamps are lighted; in another position, the lighting circuit for the lamps of the headlights and the lighting circuit for the lamps of the rear lights are closed so that these lamps are lighted. The second switch fulfills an active function only in this latter position of the first switch. Said second switch then allows of closing, either the circuit for the lamps mounted in the headlights and which intensely illuminate the road, or the circuit of the lamps mounted in the headlights and which allow of obtaining a reduced illumination of the road in view of avoiding dazzling the eyes of the drivers of vehicles running in the reverse direction.

Usually the driver has access to the second switch without having to take one hand from the steering wheel. For that purpose, it has been proposed to secure this second switch on the fixed steering post and to actuate it by means of a lever the end of which is located under the rim of the steering wheel, practically, the same casing contains both this second switch and the first one, actuated by a handle capable of being moved to three positions, as well as the switch of the warning circuit, which is also actuated by a lever the end of which is placed under the rim of the steering wheel. It is to be understood that this warning switch has nothing common with the other switches other than the casing which contains them all.

The object of the invention is to improve apparatus of this type for simplifying their construction, rendering them less costly, more positive in operation, allowing them to be more easily repaired, and also to improve the conditions of utilisation of the same.

The light emitted by the lamps the luminous intensity of which is such that it causes no dazzling for the person or driver running in reverse direction will be indicated by "code lights". The circuits for the lamps allowing to obtain the "code lights" will also be indicated by "code circuits". Likewise, use will be made of "headlight" for indicating the light emitted by the lamps of the headlights the luminous intensity of which ensures the illumination of the road on a long distance, the expression "headlight circuits" indicating the circuits of the lamps allowing to obtain the "headlight".

According to a first feature of the present invention, the "headlight" and "code" circuits are no longer connected to the second switch or control switch, but, on the contrary, to the first switch or preselection switch, the "code" circuit being in shunt on the circuit of the rear lights; the second switch is then simply adapted to be used as control switch, for closing either of these "headlight" and "code" circuits.

It will be seen that, when the first switch is in the light position, in which the front and rear lights are lighted, it is also possible to close the code lights, by the manipulation of the second switch, and to extinguish them. When the first switch is in the "headlight" position, in which the rear lights are also lighted, the second switch allows to close either the headlight circuit or the code circuit.

The characteristic arrangement above described allows a great simplification of the whole owing to the fact that the number of contacts is reduced to the minimum. This simplification is further accentuated by the second feature of the invention (which can moreover be used independently of the first one, but preferably in combination), according to which the three axes of the preselection, control and warning switches are parallel and at right angles to the bottom of the main casing which contains all the contacts or fixed contact pieces, whilst the movable contacts move parallel to this bottom which is itself parallel to the fixed steering post.

This arrangement is particularly convenient as the cover of the main casing being removed, all the contact and connection members of the switch unit are simultaneously visible on the bottom of the casing and from this fact can be easily inspected or replaced.

In one form of construction, the cover of the casing is provided with tongues which straddle the fixed steering post, the cover being secured on the casing and the latter on the steering post, simultaneously, through the medium of screws and of a collar partially surrounding the fixed steering post.

The switch unit is moreover characterised by the following features applied separately or according to any combinations:

(a) The preselection switch can assume three positions and allows, either of opening the various circuits of the lights and headlights, or of closing the circuits of the rear and front lights, or of closing the circuit of the rear lights.

(b) The control switch can assume two positions and allows in the two positions of utilisation of the preselection switch of obtaining, in one case, the closing of the circuit of the "code" lights and, in the other case, the closing, either of the circuit of the "code" or of the circuit of the headlights.

(c) The warning switch can assume three positions, one a position of rest and the two others for closing, on the one hand, the circuit of the town warning device and, on the other hand, the circuit of the road warning device, a fourth position can be provided simultaneously closing the circuits of the two warning devices.

(d) The preselection switch has a conducting member of Y shape, the ends of which are each provided with a contact; the contact of the rod constantly presses on a blade connected to a supply wire, whilst the two other contacts can press either on two insulating contact pieces, or on three contact pieces, but on two only at the same time, the intermediate contact piece belonging to the circuit of the rear lights.

(e) The Y-shaped member is movable only in translation on the operating member in antagonism to the action of a spring.

(f) The control switch is provided with a dumb-bell shaped member constituting a double contact for closing, either the circuit of the "code" lights, or the circuit of the headlights, the various connections being effected with a certain time lag relatively to each other.

(g) The warning switch can be provided with two resiliently distortable blades the ends of which clamp a rigid metal strip connected to the supply wire. On either side of said blades, but externally to the latter, are arranged two rigid metal strips against which fit either of said blades for closing the circuit of the road warning device, or that of the town warning device.

(h) The blade, ensuring the closing of the circuit of the town warning device, can have a contact bridge straddling the rigid metal strip of the circuit of the town warning device and which fits against this metal strip, only when the warning switch is further moved in the direction for closing the circuit of the road warning device, so as to ensure the simultaneous operations of both warning devices.

(i) In another form of construction, the warning switch can be provided with a finger fitting between the free ends of two flexible blades held stationary at their other ends, for pressing, according to circumstances, either of the blades on contact pieces for closing the circuit of the warning devices.

The invention further relates to other particular features which will appear from the following description with reference to the accompanying drawings, given by way of example only, in which:

Fig. 1 is a general elevation of a switch unit according to the invention.

Fig. 2 is a corresponding front view.

Fig. 7 is a partial view of a constructional modification of the warning switch.

Figure 4:
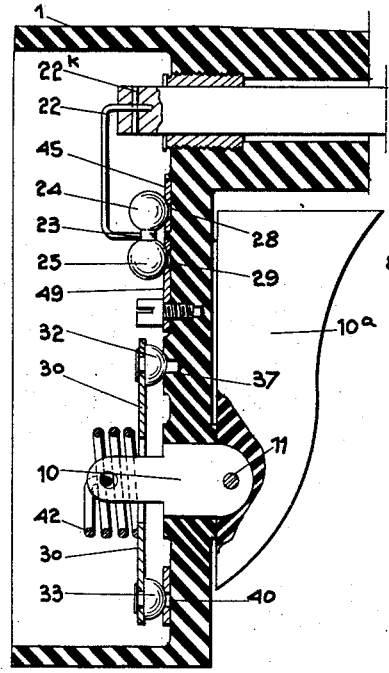
Fig. 4 is a section made according to line IV—IV of the preceding figure.

The switch unit, illustrated by way of example only, comprises a main casing 1, preferably made of a moulded material and closes by a cover 2 having four tongues 3 which fit against the fixed steering post 4. The cover 2 is secured on the casing 1 at the same time as the cover 2 is secured on the fixed steering post 4 through the medium of a collar 5 and of screws 6.

The casing 1 is provided, on its rear face, with a projection 7 having two longitudinal bores for the passage of two rods 8 and 9 terminating in arms 8ª and 9ª which can be moved by the user in the direction of the arrows (Fig. 2).

The bottom of the casing is also provided with a bore for the passage of a shaft 10 rigid with an operating member 10ª. The connection between the shaft 10 and the member 10ª is ensured owing to a port 11 provided in the shaft 10 and in which enters, upon moulding a portion of the material constituting the member 10ª, which surrounds one of the ends of shaft 10.

The arms 8ª, 9ª and the member 10ª constitute respectively the operating members of the warning switch, control switch and preselection switch. It will be noted that the three shafts 8, 9 and 10 are parallel and at right angles to the bottom of the casing which is itself parallel to the fixed steering post 4.

Figure 5:
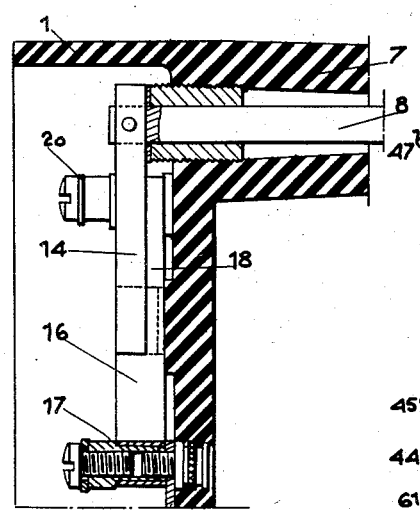
Fig. 5 is a section made according to line V—V of Fig. 3.

The free end of shaft 8 is slotted for receiving the ends of resiliently distortable blades 14 and 15 curved in reverse directions and which clamp (Figs. 3 and 5) a rigid strip 16 secured, at 17, on the bottom of the casing. On the other side of the blades 14 and 15, but externally to the latter, are arranged rigid blades 18 and 19 respectively secured at 20 and 21 on the bottom of the casing. The free ends of the blades 16, 18 and 19 are held by engagement into corresponding grooves 16ª, 18ª and 19ª formed in a projection formed on the bottom of the casing.

The free end of the rod 9 is slotted for receiving one of the ends of a blade 22, of U-shape, secured by a pin at 22ᵏ, the other end of said blade 22 being provided with a dumb-bell shaped member 23, the spheres or balls 24 and 25 of which constitute a double contact. These balls can fit either on to the contacts 26 and 27, or on the contacts 28 and 29.

On shaft 10 is mounted a Y-shaped member 30 having at its ends contacts 31, 32 and 33 in the shape of spherical caps which can fit, according to a definite choice, on to conducting contact pieces 34, 36, 38, 39, 40, 41 and on to insulating contact pieces 35, 37. The member 30 is angularly connected to the shaft 10, but it can move in translation on this shaft in antagonism to the action of a spring 42.

The contact piece 26 is constituted by a housing provided in a small conducting plate 43 rigid with the bottom of casing 1, this plate 43 being provided with a connection member 44. Likewise, the contact piece 28 is constituted by a housing provided in a small conducting plate 45 rigid with the bottom of the casing and provided with a connection member 46. The contact pieces 27 and 36 are formed in the same conducting plate 47 provided with a connection member 48. The contact pieces 28, 29 and 38 belong to a small conducting plate 49. The contact piece 34 is formed in a small conducting plate 50 provided with a connection member 51. The three contact pieces 39, 40 and 41 belong to a conducting plate 52 provided with a connection member 17 which is mingled with the connection member 17 of the rigid strip 16.

Figure 3:
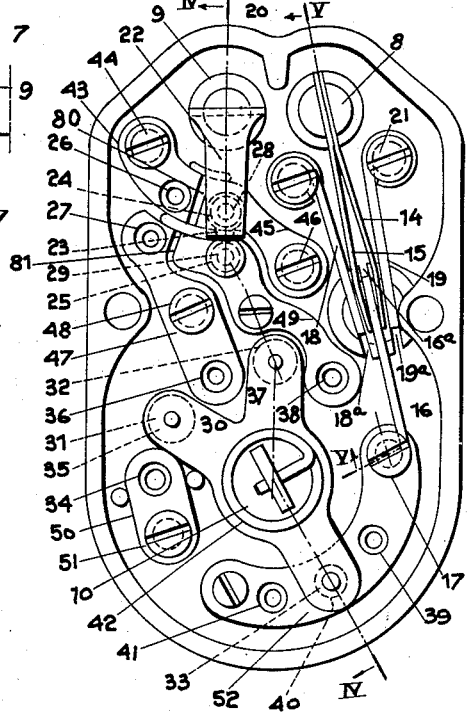
Fig. 3 is a rear view of the switch unit, the cover being removed.
Figure 6:
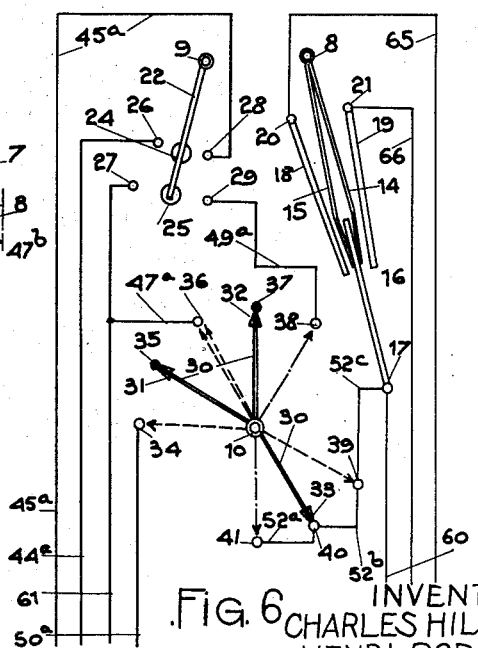
Fig. 6 is a diagrammatic view corresponding to Figure 3 and showing the connection diagram.
Figure 9:
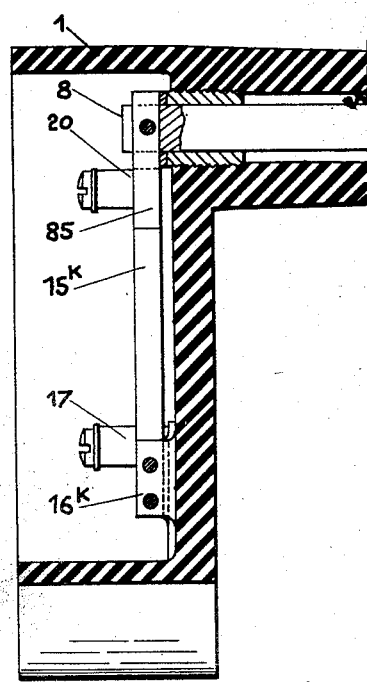
Fig. 9 is a section made according to line IX—IX of the preceding figure.

References will now be more particularly to Figs. 3 and 6. Fig. 6 is a diagrammatic view corresponding to Fig. 3. but more particularly shows the different circuits. In Fig. 6, the parts corresponding to Fig. 3 are designated by the same reference numbers as in this latter figure. The shafts 8, 9 and 10 are each indicated by two concentric circumferences.

The operation of the switch unit, previously described in its main lines, is as follows:

The various parts being arranged as indicated in Figs. 3 and 6, in which the Y-shaped member 30, or preselection switch is so arranged that its contacts 31 and 32 are placed against the insulating contact pieces 35 and 37, the contact piece 33 resting on contact 40, the various circuits of the lights are opened and the operation of the control switch 9 in one direction or the other does not cause closing of any of the circuits of the lights. The operating member 10ᵃ of the preselection switch is placed, in these conditions, in the intermediate position, as shown in Fig. 2, that is to say in the position of rest.

If the preselection switch operating member is angularly moved for bringing it to the position corresponding to that indicated in dotted lines for member 30, as shown in Fig. 6, the contact 31 engages with the contact piece 34, belonging to the circuit of the front lights, the contact 32 engages with contact pieces 36, belonging to the circuit of the rear lights, and contact 33 engages with contact piece 39, the contact pieces 41, 40 and 39 being connected by wires 52ᵃ, 52ᵇ and 52ᶜ (Fig. 6), or by the blade 52 (Fig. 3), to the connection member 17 connected to the supply wire 60. In this position of the Y-shaped member 30 that is to say of the preselection switch, the closing of the following circuits is effected.

Circuit of the rear lights: wire 60, connection member 17, wire 52ᶜ or blade 52, contact piece 39, Y-shaped member 30, contact piece 36, wire 47ᵃ or blade 47 and wire 61.

Circuit of the front lights: wire 60, connection member 17, wire 52ᶜ or blade 52, contact piece 39, Y-shaped member 30, contact piece 34 and wire 50ᵃ or blade 50.

In these conditions, the circuits of the rear and front light are therefore closed, and it is possible, by acting on the control switch 9, to close at will the circuit of the "code" lights. In fact, if the control switch 9 is moved for bringing the contacts 24 and 25 of the sphere 23 on the contacts 26 and 27, the closing of the circuit of the "code" lights is effected, this circuit being the following: wire 60, connection member 17, wire 52ᶜ or blade 52, contact piece 39, Y-shaped member 30, contact piece 36, wire 47ᵃ or blade 47, contact piece 27, contact 25, contact 24, contact piece 26 and wire 44ᵃ of the circuit of the "code" lights.

In the other position of the control switch, that is to say in case the spheres 24 and 25 of the dumb-bell member engage with the contacts 28 and 29, the closing of the circuit of the headlights (wire 45ᵃ) is not effected, as this circuit is always open at contact piece 38.

If the preselection switch is angularly moved for bringing it to the position corresponding to that indicated in dot and dash lines for member 30, as shown in Fig. 6, the contact 31 engages with contact piece 36, contact 32 engages with contact piece 38, and contact 33 engages with contact piece 41. In this position of the Y-shaped member 30, that is to say of the preselection switch, the closing of the following circuit, which is that of the rear lights, is effected: wire 60, connection member 17, wires 52ᶜ, 53ᵇ, 52ᵃ or plate 52, contact 41, Y-shaped member 30, contact piece 36, wire 47ᵃ or blade 47 and wire 61.

In these conditions, the circuit of the rear lights is therefore closed and it is possible, by acting on the control switch 9, to close at will the circuit of the "code" lights or that of the headlights. In fact, if the control switch 9 is moved, for bringing the contacts 24 and 25 of the sphere on contacts 26, the closing of the circuit of the "code" lights is effected: wire 60, connection member 17, wires 52ᶜ, 52ᵇ, 52ᵃ or blade 52, contact piece 41; Y-shaped member 30, contact piece 36, wires 47ᵃ, 47ᵇ, contact piece 27, contact 25, contact 24, contact piece 26 and wire 44ᵃ of the circuit of the "code" lights.

By moving the control switch 9, for bringing the contacts 24 and 25 on contacts 28 and 29, the closing of the circuit of the headlights is effected: wire 60, connection member 17, wires 52ᶜ, 52ᵇ, 52ᵃ or blade 52, contact piece 41, Y-shaped member 30, contact piece 38, wire 49ᵃ or blade 49, contact piece 29, contact 25, contact 24, contact piece 28 and wire 45ᵃ of the circuit of the headlights.

It will be noted, according to the invention and as shown in Fig. 3 that the space 80 separating the two conducting blades 43 and 45 is not arranged in alignment with the space 81 separating the two conduction blades 47 and 49. In these conditions, the Y-shaped member 30 being placed as indicated by dotted lines in Fig. 6, and the contacts 24 and 25 resting on contacts 28 and 29, respectively, when the control switch is moved for bringing contacts 24 and 25 on contacts 26 and 27, contact 24 engages with blade 43, that is to say contact 26, before engaging with blade 47, that is to say contact 27. By restoring the control switch to its original position, contact 27, that is to say blade 47 is left before contact 26, that is to say blade 43, and contact 25 engages with blade 49, that is to say contact 29, before engaging with blade 45, that is to say contact 28. When the Y-shaped member is placed as indicated in dot and dash lines in Fig. 6, the contact piece 28 being then connected to the battery and the control switch ensuring the connection between contact pieces 23 and 29 (headlight circuit), the circuit of the "code" lights is momentarily closed by the connection between blades 49 and 43, but, as soon as contact 25 engages with contact 27, this circuit is momentarily opened and replaced by the circuit indicated in operation and the closing of which is ensured by the connection of contact pieces 26 and 27. When the control switch is restored to its original position, the circuit of the "code" lights is opened only when contact piece 24 moves away from the blade 43, the contact piece 25 being supplied without interruption either by the blade 47, or by the blade 49, or by both together when contact piece 25 passes from one to the other.

The arrangement of the spaces 80 and 81 allows therefore particularly, in the case of lighting of the lights, of ensuring the release of blade 47 under 10 amperes, whereas the contacts 24 and 25 by simultaneously moving away from blades 43 and 47 caused opening of the circuit under 30 amperes and an untimely lighting of the headlights when the dumb-bell member touched simultaneously blades 47, 43, 45 and 49, that is to say when the spaces 80 and 81 were placed in alignment with each other.

Practically, the control switch 9 can substantially occupy only two main positions, means being provided for that purpose.

It will be noted, according to the invention, that the arrangement of shafts 8, 9 and 10 at right angles to the bottom of casing 1 allows of placing all the fixed contacts and the connections on the inner face of the casing bottom, the movable contacts moving parallel to this bottom.

Concerning the warning switch, it can be moved in one direction or the other for ensuring the closing of the town warning device, or of the road warning device. When this warning switch is moved for engaging the resilient blade 15 with the rigid blade 18, the closing of the following circuit, which is that of the town warning, is effected: wire 60, connection member 17, blade 16, blade 14, blade 15, blade 18, connection member 20 and wire 65.

If this warning switch is moved in the other direction, for engaging the blade 14 against blade 19, the closing of the following circuit, which is that of the road warning device, is effected: wire 60, connection member 17, blade 16, blade 15, blade 14, blade 19, connection member 21 and wire 66.

In the modification illustrated in Fig. 7, the blade 15 has a particular contact 67, of bridge-shape, straddling the blade 18, so that by accentuating the displacement of the warning switch, in the direction for closing the circuit of the road warning device contact 67, owing to the curvature of blade 15, is caused to engage with blade 18, this also closing the circuit of the town warning device, both warning devices then simultaneously operate.

Figure 8:
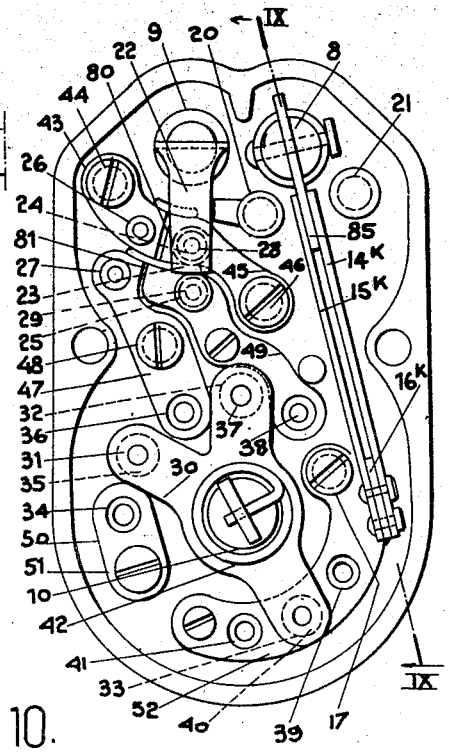
Fig. 8 is a view corresponding to Figure 3, but showing another form of construction of a warning switch.
Figure 10:
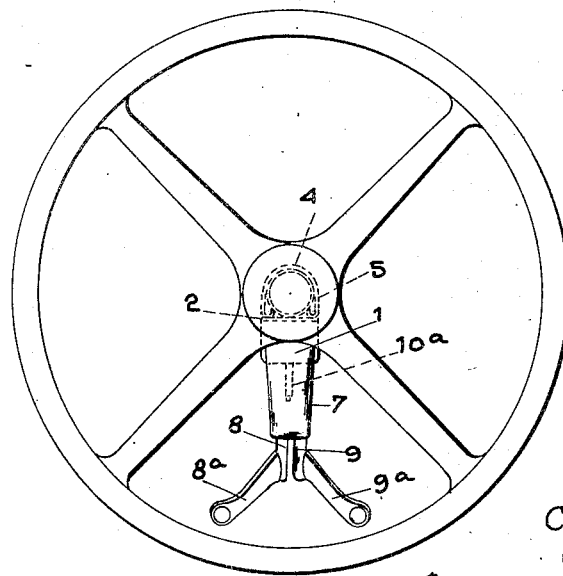
Fig. 10 is a general plan view of a switch unit mounted on the fixed steering post.

Fig. 8 substantially corresponds to Fig. 3, concerning the preselection switch and control switch, but it shows another form of construction of the warning switch.

In this form of construction, two blades $15^k$ and $14^k$ are rigidly mounted, at one of their ends, on a bent down portion $16^k$ of the blade 52 carrying the contact pieces 41, 40, 39 and th connection member 17. Between the free ends of blades $15^k$ and $14^k$ is inserted a rigid blade 85 rigid with the pivot pin 8 of the warning switch. The angular displacement of this switch in one direction or the other causes, owing to the rigid blade 85 the application, either of the free end of the flexible blade $15^k$ against the conducting contact piece 20, or of the free end of flexible blade $16^k$ against the conducting contact piece 21, in order to ensure the closing of the circuit of the town warning device or of the road warning device.

It is obvious that the forms of construction described and illustrated are given herein by way of indication only and not in a limiting sense. All changes or modifications which do not alter in any way the main features above set forth and the desired result, remain included in the scope of the present invention.

What I claim as my invention and desire to secure by Letters Patent is:

1. In combination, for constituting a switch unit comprising a main casing made of insulating material; a first rotary three-position switch comprising, a first conducting member rotatively mounted in said casing and for occupying three positions and devised for constituting first, second and third movable contact-pieces, located at equal distances from the axis of rotation of said first conducting member; means actuated by hand, for moving said first member and causing it to assume any one of the three positions; a fourth fixed conducting contact-piece, a fifth fixed insulating contact-piece, a sixth fixed conducting contact-piece, a seventh fixed insulating contact-piece, eighth, ninth, tenth and eleventh fixed conducting contact-pieces, said contact-pieces from the fifth to the eleventh being arranged and distributed in the order indicated on said casing, at the same distance from the axis of rotation of said first conducting member, as the three contact-pieces carried by the latter, said first rotary switch allowing of controlling third and fourth circuits; a second rotary two-positions switch comprising, a second conducting member rotatively mounted in said casing for occupying two positions and devised for constituting twelfth and thirteenth movable contact-pieces located at different distances from the axis of rotation of said second conducting member; means actuated by hand for moving said second member and causing it to assume any one of the two positions; fourteenth, fifteenth, sixteenth and seventeenth fixed conducting contact-pieces, said contact-pieces from the fourteenth to the seventeenth being arranged and distributed on said casing so that the fourteenth and the seventeenth contact-pieces are located at equal distances from the axis of rotation of said second conducting member as the thirteenth contact-piece of the latter, and that the fifteenth and sixteenth contact-pieces are located at equal distances from the axis of rotation of said second conducting member as the twelfth contact-piece of the latter, said second rotary switch allowing of controlling said third and fourth circuits after they have been prepared by said first switch.

2. In combination, for constituting a switch unit comprising a main casing made of insulating material; a first rotary three-position switch comprising, a first conducting member rotatively mounted in said casing and for occupying three positions and devised for constituting first, second and third movable contact-pieces, located at equal distances from the axis of rotation of said first conducting member; means actuated by hand, for moving said first member and causing it to assume any one of the three positions; a fourth fixed conducting contact-piece, a fifth fixed insulating contact-piece, a sixth fixed conducting contact-piece, a seventh fixed insulating contact-piece, eighth, ninth, tenth and eleventh fixed conducting contact-pieces, said contact-pieces from the fifth to the eleventh being arranged and distributed in the order indicated on said casing, at the same distance from the axis of rotation of said first conducting member as the three contact-pieces carried by the latter, said first rotary switch allowing of controlling third and fourth circuits; a second rotary two-position switch comprising, a second conducting member rotatively mounted in said casing for occupying two positions and devised for constituting twelfth and thirteenth movable contact-pieces located at different distances from the axis of rotation of said second conducting member; means actuated by hand for moving said second member and causing it to assume any one of the two positions; fourteenth, fifteenth, sixteenth and seventeenth fixed conducting contact-pieces, said contact-pieces from the fourteenth to the seventeenth being arranged and distributed on said casing so that the fourteenth and the seventeenth contact-pieces are located at equal distances from the axis of rotation of said second conducting member as the thirteenth contact-piece of the latter, and that the fifteenth and sixteenth contact-pieces are located at equal distances from the axis of rotation of said second conducting member as the twelfth contact-piece of the latter, said second rotary switch allowing of controlling said third and fourth circuits after they have been prepared by said first switch; and a third rotary three-position switch comprising; a third conducting member rotatively mounted in said casing for occupying three positions; means actuated by hand for moving said third conducting member and causing it to occupy any one of the three positions; first and second conducting elements mounted on the fixed casing and arranged on either side of said third conducting member; a third conducting element mounted on said casing and constantly in contact with said third conducting member; means for connecting the eighth and the seventeenth contact-pieces; means for connecting the ninth, tenth and eleventh contact-pieces to each other and to said third conducting element, said third conducting member with the three conducting elements which form the third switch controlling fifth and sixth circuits.

3. In a switch unit as claimed in claim 2, said casing being provided with three parallel bores, the first bore for receiving the rotary part of the first switch, the second bore for receiving the rotary part of the second switch, and the third bore for receiving the rotary part of the third switch.

4. In a switch unit as claimed in claim 2, said third conducting member being constituted by two conducting blades resiliently distortable and rigidly secured to one end of said control means actuated by hand and which clamp between them, at their other ends, the third conducting element, so that the displacement of said third conducting member in one direction or the other causing the application of one or the other of the blades on the first or the second element for electrically connecting the first or the second element with the third element for closing the fifth or the sixth circuit.

5. In a switch unit as claimed in claim 2, said third conducting member being constituted by a rigid conducting plate rigidly secured at one end to said control means actuated by hand and the free end of which is clamped between the free ends of two conducting blades resiliently distortable, constituting the third conducting element and which are rigidly held stationary at their other ends so that the displacement of said third conducting member in one direction or the other causes the application of one or the other of the blades on the first or the second element for electrically connecting the first or the second element with said third element formed by the two blades for closing the fifth or the sixth circuit.

6. In a switch unit as claimed in claim 2, the means actuated by hand for moving said first conducting member being constituted by a vertical member projecting from the casing, the means actuated by hand for moving the said second conducting member are constituted by a rod projecting from the casing and terminating in an operating tongue and the means actuated by hand for moving said third conducting member being constituted by another rod projecting from the casing and terminating in another operating tongue.

CHARLES HILAIRE HENRI RODANET.